MICHAEL R. MILLER,

INVENTOR

BY Hall & Houghton

ATTORNEY

MICHAEL R. MILLER,
INVENTOR

BY Hall & Houghton

ATTORNEY

United States Patent Office 3,560,869

Patented Feb. 2, 1971

3,560,869

FREQUENCY CONTROL OF OSCILLATORS

Michael Robert Miller, Watford, England, assignor to Her Majesty's Postmaster General of The General Post Office, London, England Filed Mar. 11, 1968, Ser. No. 712,130
Claims priority, application Great Britain, Mar. 14, 1967, 11,842/67
Int. Cl. H04j 3/06
U.S. Cl. 331—2 9 Claims

ABSTRACT OF THE DISCLOSURE

A means for controlling the operating frequencies of an interconnected system of oscillators. Frequency control of each oscillator is effected by application of D.C. signals derived from comparison between the operating frequencies of the oscillator concerned and the respective oscillators to which it is directly connected. The comparison is used to produce D.C. error signals from which the D.C. frequency shifting signal is derived, the latter having a magnitude dependent on the algebraic sum of the error signals divided by a factor dependent on the number of other oscillators to which the oscillator concerned is directly connected. Thus, the degree of control exercised on the system by any particular oscillator increases with the number of connections between that oscillator and other oscillators in the system. The invention is described with reference to a P.C.M. communications system and has other applications.

BACKGROUND OF THE INVENTION

(1) Field of the invention

This invention pertains to pulse communication systems and the like and aims to provide improved means for timing the pulses at various parts of the system.

(2) Description of prior art

It is known to those skilled in the art that in pulse communication systems the timing of the pulses at various parts of the system must be controlled, and one known way of achieving such control is described in U.S. Pat. No. 3,093,815, issued June 11, 1963 to Karnaugh.

SUMMARY OF THE INVENTION

This invention is concerned with an improvement of the system described in the aforesaid Karnaugh patent for controlling the frequencies of oscillators in a system of interconnected oscillators having at least one oscillator directly connected to two or more other oscillators in the system. A change in frequency of any one oscillator is used to cause adjustments in frequency both of that oscillator and to all oscillators with which it is directly connected so to reduce towards zero differences in operating frequency of the oscillators in the system.

According to the present invention, in an interconnected system of oscillators the frequencies of which can be varied by application thereto of D.C. signals in which at least one of the oscillators is connected directly to two or more oscillators, each oscillator has:

(a) for each other oscillator in the system to which it is connected, a separate frequency comparator operable to generate D.C. control signals the sense of which is dependent on the sense of any difference in frequency between the two oscillators, (b) a signal combining network the output of which is connected to apply frequency adjusting D.C. signals to the oscillator, the combining network being connected to receive D.C. control signals from all the frequency comparators of the oscillator and being operable to produce a D.C. frequency shifting signal having a magnitude determined by the algebraic sum of the D.C. control signals divided by a predetermined factor dependent on the number of comparators of that oscillator, the combining network having an output connected to apply the shifting signal to the oscillator in a sense to reduce the differences in frequency between the oscillators in the system. In such a system, the frequency shifting signal applied to any oscillator in the system is weighted in dependence on the number of other oscillators to which it is directly connected. Thus, the larger the number of oscillators to which a particular oscillator is directly connected, the greater the influence of the frequency of that oscillator on the overall frequency of the system. A system embodying the invention has the advantage that it is inherently stable.

Although the invention has general application in a system of interconnected oscillators, it has particularly useful application in a time division multiplex communications system, e.g. a pulse code modulation system such as disclosed in copending application Ser. No. 585,813 to J. R. Jarvis, filed Oct. 11, 1966. In such a system there are a plurality of interconnected switching stages each having a local master timing oscillator the frequency of which is adjustable by D.C. signals and the present invention is useful when at least one of the switching stages is itself connected directly to two or more other switching stages. Each switching stage includes for each incoming path to that stage a separate digit storage means operable under control of the local master timing oscillator and of incoming digits to that stage on the path concerned to absorb differences between the incoming digit times and local digit times generated by the local master timing oscillator of that stage. Each storage means has its own sensing means responsive to the state of fill of that storage means to generate first D.C. error signals having sign and magnitude dependent on the state of fill of that storage means, means operable to encode the first error signals generated by that sensing means and to transmit the encoded signals in selected outgoing channel slots to the outgoing path associated with that storage means. Each incoming path to a switching stage further has means operable to receive and to decode to second D.C. error signals, encoded error signals from selected channel slots on that incoming path, such second error signals having an opposite sign to the first D.C. error signals from which they derive. Each incoming path also has means connected to add algebraically the first and second error signals generated by and received by the sensing and receiving means of that incoming path to produce a composite D.C. error signal. In accordance with the present invention, each switching stage includes a combining network to which are applied the composite D.C. error signals from the algebraic adding means of each incoming path to that switching stage. The combining network is operable to produce a D.C. output signal having a magnitude determined by the algebraic sum of the composite D.C. error signals divided by a predetermined factor dependent on the number of incoming paths to that stage. The D.C. output signal from the combining network is fed to a frequency control input of the local master timing oscillator of that switching stage in such a sense that the resultant frequency change of the oscillator tends to reduce each of the composite D.C. error signals to zero. The encoding and decoding means referred to above is not essential and may be omitted from the switching stages.

By use of the invention, it is assured that the oscillator connected directly to the greatest number of other oscillators in the system has the greatest degree of control of the frequencies of the oscillators in the system.

BRIEF DESCRIPTION OF THE DRAWINGS

In the accompanying drawings.

DETAILED DESCRIPTION

Figure 1:
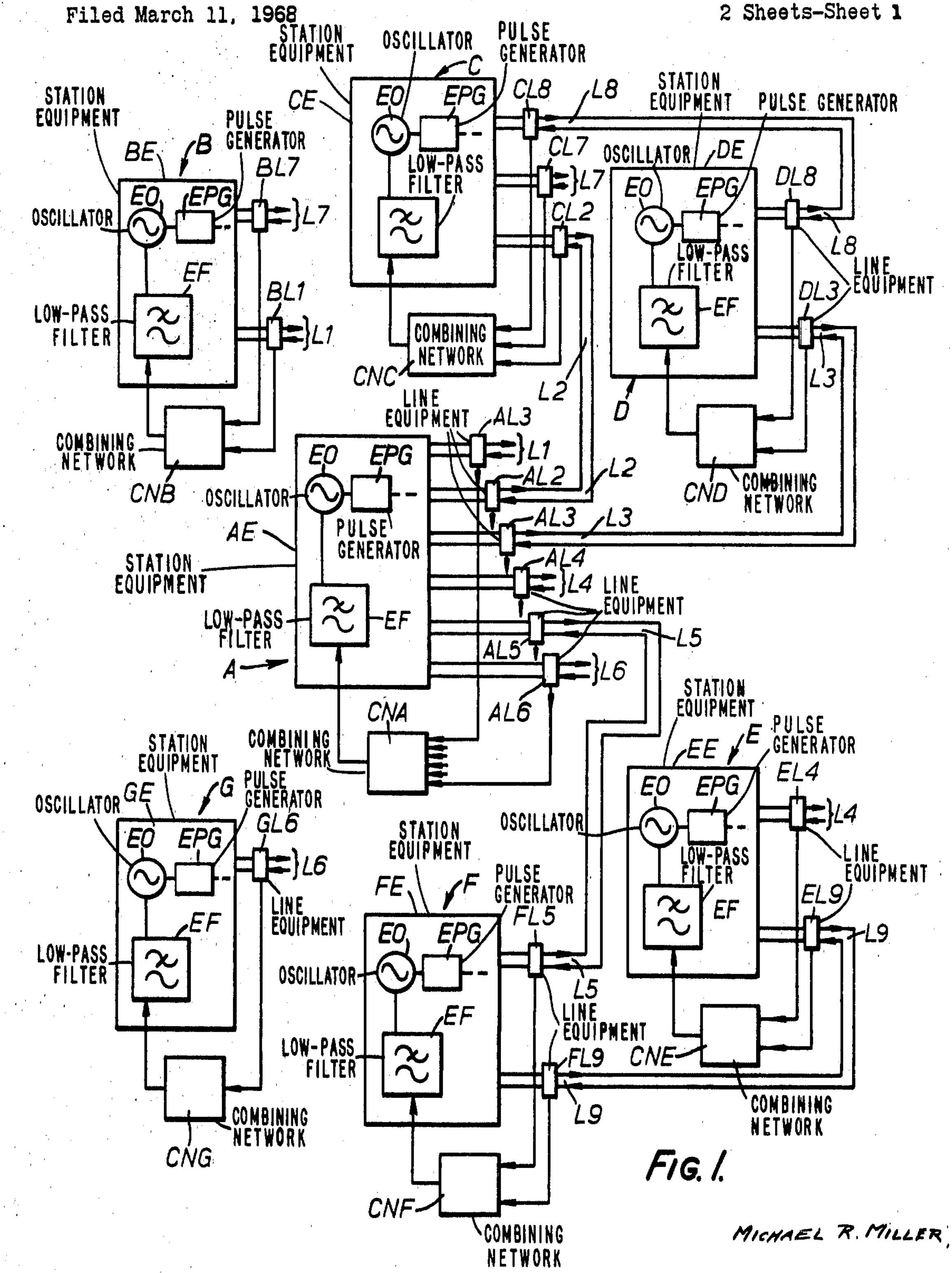
FIG. 1 is a schematic block diagram of parts of a pulse channel multiplex (P.C.M.) system relevant to the invention.

In a preferred embodiment of the invention, each combining network produces a D.C. output signal having a magnitude determined by the alegbraic sum of the D.C. signal inputs divided by a factor directly proportional to the number of D.C. signal inputs to that network.

The invention is applicable to any system of interconnected oscillators in which at least one oscillator is connected directly to two or more oscillators, and in which frequency differences between directly connected oscillators are used to produce control signals to adjust the frequencies of those oscillators to reduce the frequency difference towards zero. The invention is concerned with providing a control arrangement that is effective to cause the rate of change of frequency of an oscillator to vary as a function of the frequency differences between that oscillator and all those to which it is directly connected.

It can be shown that in such a system $$\frac{df_j}{dt}=\sum_{i=1}^{n} k_i(f_i-f_j)$$

where $f_i$ is the operating frequency of oscillator $i$
$f_j$ is the operating frequency of oscillator $j$
$n$ represents the number of oscillators in the system
$k_i$ represents a weighting factor associated with oscillator $i$ and determining the magnitude of frequency control signals applied to that oscillator In a steady state:

$$f_j=\frac{\sum_{i=1}^{n} f_{oi}/k_i}{\sum_{i=1}^{n} 1/k_i}$$

where $f_{oi}$ is the uncontrolled frequency of oscillator $i$, and all frequencies $f_1, f_2, f_3 \ldots f_i \ldots f_j \ldots f_n$ are equal.

Thus, by making $k_i$ equal to $k/m_i$ in a steady state $$f_j=\frac{\sum_{i=1}^{n} m_i f_{oi}}{\sum_{i=1}^{n} m_i}$$

where $k$ is a predetermined weighting factor, and
$m_i$ is the number of other oscillators to which oscillator $i$ is directly connected.

Thus the contribution to overall frequency adjustment of the oscillators in the system made by any particular oscillator is dependent upon the number of other oscillators to which that oscillator is directly connected. In a particular system, wherein $k_i=k/m_i$, a central oscillator may have direct connections to all the other oscillators in the system, each of the other oscillators being, on average, connected directly to about 10% of the total number of oscillators. In such a case the final connected frequency $f_o$ of the system would be:

$$f_o=f_t+\sum_{i=1}^{n} \tfrac{1}{10} f_{oi}$$

where $f_t$ is the frequency of the central oscillator.

If the number of oscillators in the system is 100, then the final operating frequency of the system will be about 10% dependent on the frequency $f_t$. By adjustment of the weighting factor $k_i$ at each oscillator, the final frequency can be made more, or less, dependent on $f_t$. In the event that the central oscillator fails, the overall operating frequency of the system assumes a fresh value which is the weighted mean of the frequencies of the remaining stations. It is desirable that $k_i \leqslant k/m_i$ and in a preferred arrangement having $n+1$ oscillators the weighting factor at the central oscillator is less than $k/m_i$ and at the other $n$ oscillators in the system is equal to $k/m_i$.

Adjustment of the characteristics of the central oscillator to alter its nominal frequency i.e. the frequency at which it would oscillate in the absence of control signals, will adjust the steady state operating frequency of the whole system.

Figure 2:
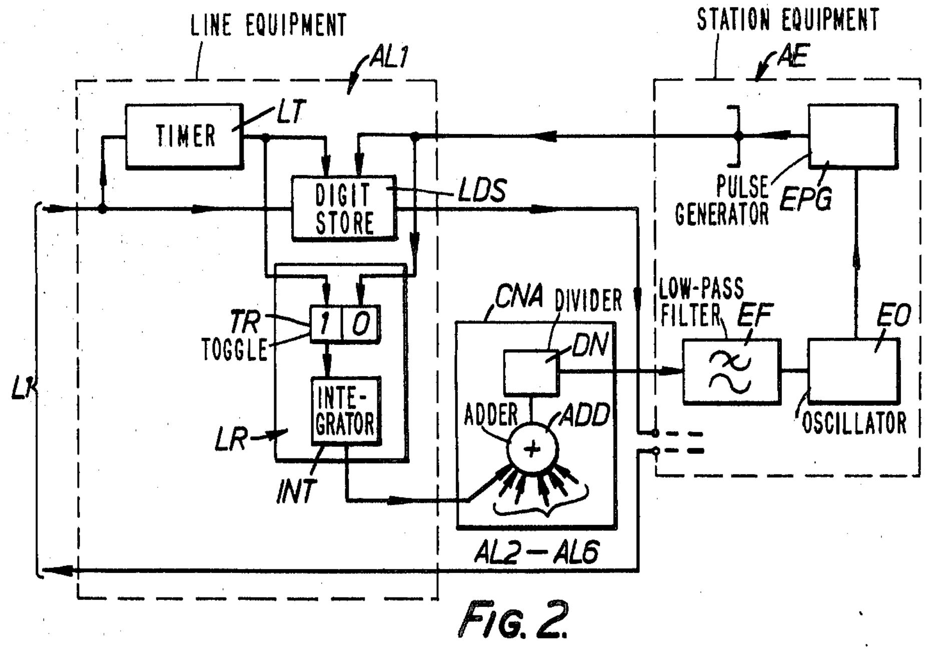
FIGS. 2 and 3 are similar diagrams of alternative forms of part of FIG. 1.
Figure 3:
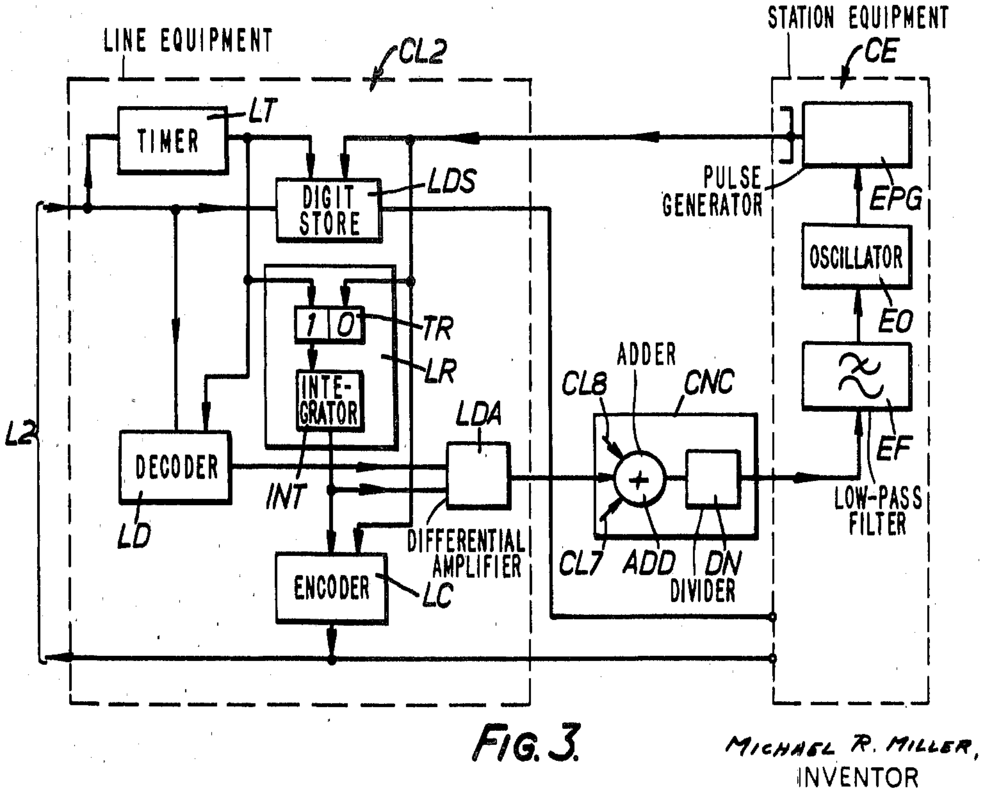

By way of example, the application of the invention to a P.C.M. communications system, will be described in greater detail with reference to the accompanying drawings, in which as above noted:

FIG. 1 shows, schematically, parts of a P.C.M. system relevant to the invention, and FIGS. 2 and 3 show alternative forms of part of FIG. 1.

The drawing shows part of a P.C.M. telephone communications system having a central station, or exchange, A connected by lines L1 . . . L6 to further stations, or exchanges, B–G respectively. Of these further stations, station C is also connected to station B and D by lines L7 and L8 and station E is also connected to station F by line L9.

Each of the stations has equipment common to all the lines connected to it and designated AE, BE etc. Each line connected to a station has its own line equipment at that station and designated by a combination of the exchange and line references, e.g. AL1, CL1, GL6.

Each station has a master local timing oscillator EO which operates at the digit pulse repetition frequency (P.R.F.). The operating frequency of the oscillator EO can be adjusted by D.C. control signals applied to a frequency control input of the oscillator via a low pass filter EF. The various timing waveforms required to operate the station are all derived from the oscillator EO by a pulse generator EPG and serve to determine the timing of the slots and of digits within the slots. The switching network of the station (not shown in FIG. 1) is connected to respective lines of the station by the line equipments referred to previously.

In order to maintain synchronisation between the oscillators EO of the several stations A–G, each of the line equipments has a frequency comparator facility by which the P.R.F. of digits incoming to that line equipment is compared with the P.R.F. of the digits generated by the oscillator EO of the station of which that line equipment forms part. Any difference between the P.R.F. of the local and incoming digits is used to generate a D.C. error signal having a sense appropriate to the sense of the difference, and the D.C. error signal outputs of the or each line equipment of the station concerned are fed as inputs to a combining network of that station, the networks being identified in the drawing by the relative station designations i.e. CNA, CNB . . . CNG. Each combining network algebraically sums the error signals fed to it to produce a summation signal which is divided by a factor dependent on the number of inputs to the combining network (as previously explained). The resultant signal is fed over the associated filter EF to adjust the frequency of the station oscillator EO in a sense tending to equalise the frequencies of the oscillators in the system.

The basic components of one form of line equipment are shown in FIG. 2 which shows the equipment AL1 of FIG. 1 together with components of its associated station equipment AE. The other line equipments in FIG. 1 would be likewise constructed. The line equipment includes a storage or delay network LDS into which incoming digits to the line equipment are written, under control of an incoming timer LT, at the incoming digit P.R.F. and subsequently read out of the store, under control of the pulse generator EPG, at the local digit P.R.F. and fed to the station switching network (not illustrated). The line equipment AL1 also has apparatus for generating D.C. error signals dependent on the state of fill of the digit store LDS. The state of fill of the store is determined by a reader LR comprising a toggle TR which is set by pulses, derived from the timer LT, at selected incoming digit pulse times and reset by selected pulses, derived from the pulse generator EPG, at selected local digit pulse times. Any timing differences between the setting and resetting pulses can be used to indicate the state of fill of the store LDS. When a predetermined amount of the store capacity is being utilised, e.g. when the store is half-full, the output from the toggle TR, consisting of a square wave, is arranged to have a 50/50 mark/space ratio. The mark/space ratio varies linearly from this value in a sense dependent on whether the store is more or less full than the predetermined amount. The output of the toggle TR is fed to an integrator INT which generates a D.C. error signal the sign of which depends on and the magnitude of which varies linearly with the mark/space ratio of the trigger output and hence on the state of fill of the store LDS.

The D.C. error signal from the integrator INT is fed to one input to an algebraic adder (which does not produce a phase inversion) ADD forming part of the combining network CNA. The adder also receives inputs from the other line equipments AL2 and AL6 connected to the station AE and the output from the adder ADD is thus dependent on the algebraic sum of the D.C. error signal inputs to the adder. The output from the adder is fed to a network DN which divides the adder output by a factor dependent on the number of inputs to the adder. The resultant outputs signal from the network DN is fed via a low pass filter EF on a frequency shifting signal to the oscillator EO of station CE to change the frequency of the oscillator in a sense to cause reduction of the error signal inputs to the adder ADD towards zero and hence to equalise the operating frequencies of all the oscillators EO in the system.

Alternatively, the line equipments can each be constructed in the manner described in detail in copending application Ser. No. 585,813 to J. R. Jarvis, filed Oct. 11, 1966 and shown in FIG. 3 of the accompanying drawings which illustrate the equipment CL2 shown in FIG. 1. FIG. 2 also shows parts of the station equipment AE to which the line equipment AL1 is connected. The other line equipments shown in FIG. 1 would be likewise constructed.

Certain of the components shown in FIG. 3 are similar to and operate in a like manner to those shown in FIG. 2 and in FIG. 3 these components have like references and will now be further described. FIG. 3 additionally employs a coder LC, a decoder LD and a differential amplifier LDA. The error signal from the integrator INT is fed to the encoder LC and also to the differential amplifier LDA. The encoder LC converts the D.C. error signal into digital form and transmits it to the line equipment AL2 (FIG. 1) connected to the opposite end of the line L2. The line equipment CL2 also receives digital error signals from the line equipment AL2 and the decoder converts them into a D.C. error signal (of opposite polarity from the D.C. error signal from which it was derived) which also is fed to the differential amplifier LDA. The composite D.C. error signal output from the amplifier LDA is applied as an input to the adder ADD as are the composite D.C. error signals from the line equipments CL7 . . . CL8.

The combining networks of the stations A–G each operates to produce an output signal which is the algebraic sum of the inputs to the combining network divided by a weighting factor dependent on the number of inputs. In a preferred arrangement, the weighting factors employed in the combining networks of the stations A–G shown in FIG. 1 are such that the output signal from the combining network CNA is less than the algebraic sum of the input signals to that network divided by a factor $k/m_i$. The other combining networks, i.e. CNB–CNG produce output signals equal to the algebraic sums of the input signals to the respective networks divided by a factor $k/m_i$. As previously mentioned, $k$ is predetermined weighting factor and $m_i$ is the number of the signals to the combining network concerned. Thus, in the embodiment shown in FIG. 1 the combining network CNA produces an output signal which is less than the algebraic sum of the input signals to the network divided by a factor $k/6$. The networks CNB . . . CNG produce output signals which are equal to the algebraic sums of the input signals to the respective networks, divided by factors as shown below:

| | Division Factor |
|---|---|
| CNB | $k/2$ |
| CNC | $k/3$ |
| CND | $k/2$ |
| CNE | $k/2$ |
| CNF | $k/2$ |
| CNG | $k/1$ |

It will be appreciated that the combining networks CNA . . . CNG can operate in several different manners. For example, the input signals to a network may be individually operated on by the desired weighting factor, and the weighted signals algebraically summed. Alternatively, the weighting factor may be applied following the algebraic summation. In the latter case, a simplified form of the combining network may be represented as a number of resistors, corresponding to the number of inputs to the network, having a common output connected via a potentiometer to ground potential, with an output taken from the tapping point of the potentiometer, the tapping point conveniently being adjustable. The voltage drop across the potentiometer will represent the algebraic sum of the input signals fed to the respective resistors and the weighting factor will be determined by the position of the tapping point.

It will be appreciated that the invention can be used to control a system of interconnected oscillators other than used in a P.C.M. communications system. In particular, although in the P.C.M. communications system described the oscillators EO control the generation of pulses, and the frequency comparators detect differences in pulse (digit) times which represent changes in frequency between oscillators in the system, the invention can be used in systems in which the error signals representing frequency differences are obtained by other means, e.g. by direct frequency comparison, provided the comparator (or the operating portion of the comparator) has a linear phase/output characteristic.

I claim:

1. A system of three or more oscillators in which direct current frequency-shifting signals are applied to the oscillators to reduce frequency differences therebetween, characterised in that:

each oscillator has at least one frequency comparator associated therewith in which in the operation of the system the frequency of the particular oscillator is compared with that of another oscillator of the system, there being a separate comparator for each other oscillator to which the particular oscillator is coupled, at least one oscillator of the system being coupled by frequency comparators to at least two other oscillators, each frequency comparator generating, in operation, a direct current error signal the sense of which depends on the sense of any difference in frequency between the two oscillators to which the particular comparator is connected, at least one oscillator has a respective signal combining network, means are provided for connecting the error signals from the frequency comparators associated with each oscillator to the signal combining network respective to the oscillator, for generating a direct current frequency shifting signal having a magnitude determined by the algebraic sum of the direct current error signals connected to the network divided by a predetermined factor dependent on the number of comparators of that oscillator, and means are provided for applying each direct current frequency shifting signal to its associated respective oscillator in a sense to reduce differences in frequency between the oscillators in the system.

2. A system according to claim 1 wherein the system contains $n+1$ oscillators and one of the oscillators is coupled by frequency comparators to the other $n$ oscillators.

3. A system according to claim 2, wherein each signal combining network generates, in use, a frequency shifting signal the magnitude of which is dependent on the algebraic sum of its associated direct-current error signals divided by a factor directly proportioned to the number of error signal inputs to that network.

4. A system according to claim 3 wherein the signal combining network of the said one oscillator generates, in use, a frequency shifting signal determined by the algebraic sum of the direct current error signals to that network divided by a factor less than $k/n$, and the combining networks of the other $n$ oscillators are each operable to produce a frequency shifting signal determined by the algebraic sum of the direct current error signals to that network divided by a factor equal to $k/m_i$, where $k$ is a predetermined factor and $m_i$ is the number of other oscillators in the system to which the particular oscillator $i(i=1 \ldots n)$ is directly coupled.

5. A system according to claim 1, wherein the system is a time division multiplex communications system in which the oscillators control the generation of and the pulse repetition frequency of pulses transmitted through the system.

6. A system according to claim 2, in which the oscillators control the pulse repetition frequency of pulses generated by means associated respectively with the oscillators, and in which each frequency comparator is operable to generate a pulsed output the mark/space ratio of which is dependent on timing differences between pulses generated under the control of the two oscillators coupled by and in which the direct current error signal has a magnitude and sense which depend on the said mark/space ratio.

7. A time division multiplex digital communications system including a plurality of interconnected switching stages one of which is connected to at least two other switching stages, each switching stage including a master timing oscillator the frequency of which is adjustable by direct current error signals, for each communications link connected to the stage separate digit storage means operable under control of the master timing oscillator and income digits on the associated communications link to absorb differences between the incoming digit times and local digit times generated by the master timing oscillator, sensing means responsive to the state of fill of the storage means to generate D.C. error signals having a sign and magnitude dependent on the said state of fill of the storage means, and a combining network connected to receive direct current error signals from the sensing means of each link connected to that stage and to produce a direct current frequency shifting signal having a magnitude determined by the algebraic sum of the received direct current error signals divided by a predetermined factor dependent on the number of communication links connected to that stage, the combining network having an output connected to apply the direct current frequency shifting signal to the master timing oscillator in a sense to cause reduction of each composite direct current error signal to zero.

8. A system according to claim 7, further including for each communication link connected to a switching stage, means operable to encode the first error signals and to transmit the encoded signals to the associated communications link, means operable to receive and decode into second direct current error signals error signals incoming to that stage on the associated communications link, the second direct current error signals having an opposite sign to the direct current error signals from which they derive, and means connected to add algebraically the said error signals to produce a composite direct current error signal, and in which the combining network is connected to receive the composite direct current error signals from the adding means of each link connected to that stage.

9. A system according to claim 1, in which each combining network has an adding circuit producing a summation signal representing the algebraic sum of the direct current error input signals to the network and has a dividing circuit for dividing the summation signal by the predetermined factor to produce the direct current frequency shifting signal.

References Cited

UNITED STATES PATENTS

| | | | |
|---|---|---|---|
| 3,424,864 | 1/1969 | Williams | 178—69.5 |
| 3,453,594 | 7/1969 | Jarvis | 178—69.5 |

FOREIGN PATENTS

| | | | |
|---|---|---|---|
| 588,739 | 12/1959 | Canada | 331—2 |

JOHN KOMINSKI, Primary Examiner

U.S. Cl. X.R.

178—69.5; 179—15; 331—17